US012412560B2

(12) United States Patent
Lawrenson et al.

(10) Patent No.: US 12,412,560 B2
(45) Date of Patent: Sep. 9, 2025

(54) SYSTEMS AND METHODS FOR SELECTING A VOICE TO USE DURING A COMMUNICATION WITH A USER

(71) Applicant: TELEFONAKTIEBOLAGET LM ERICSSON (PUBL), Stockholm (SE)

(72) Inventors: Matthew John Lawrenson, Bussigny (CH); Julian Charles Nolan, Pully (CH)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 138 days.

(21) Appl. No.: 17/384,336

(22) Filed: Jul. 23, 2021

(65) Prior Publication Data
US 2021/0350785 A1 Nov. 11, 2021

Related U.S. Application Data

(63) Continuation of application No. 16/264,874, filed on Feb. 1, 2019, now Pat. No. 11,087,736, which is a
(Continued)

(51) Int. Cl.
*G10L 13/033* (2013.01)
*G06F 3/16* (2006.01)
(Continued)

(52) U.S. Cl.
CPC ........... *G10L 13/033* (2013.01); *G06F 3/167* (2013.01); *G10L 15/22* (2013.01); *G10L 25/63* (2013.01);
(Continued)

(58) Field of Classification Search
CPC ....... G10L 13/033; G10L 15/22; G10L 25/63; G10L 25/90; G06F 3/167; H04M 3/493;
(Continued)

(56) References Cited

U.S. PATENT DOCUMENTS 5,704,007 A * 12/1997 Cecys ............... G10L 13/04
704/E13.007
6,269,336 B1 7/2001 Ladd et al.
(Continued)

FOREIGN PATENT DOCUMENTS

CN 103543979 1/2011
JP 2003099080 A * 4/2003

OTHER PUBLICATIONS

International Search Report and Written Opinion issued in Application No. PCT/SE2014!051336 dated Jun. 25, 2015, 10 pages.
(Continued)

*Primary Examiner* — Jesse S Pullias
(74) *Attorney, Agent, or Firm* — Rothwell, Figg, Ernst & Manbeck, P.C.

(57) ABSTRACT

A computing device having the capability to dynamically select a voice that will be used by a speech synthesizer in creating synthesized speech for use in communicating with a user of the computing device is provided. For example, in some embodiments, the computing device: i) employs the speech synthesizer to have a first audible communication with the user using a first voice; ii) stores user satisfaction data that can be used to determine a user's satisfaction with an action the user took in response to the first audible communication; and iii) determines whether a different voice should be used during a second audible communication with the user based on the stored user satisfaction data.

24 Claims, 9 Drawing Sheets

Related U.S. Application Data continuation of application No. 15/525,720, filed as application No. PCT/SE2014/051336 on Nov. 11, 2014, now Pat. No. 10,224,022.

(51) Int. Cl.

| | |
|---|---|
| *G06Q 30/02* | (2023.01) |
| *G10L 15/22* | (2006.01) |
| *G10L 25/63* | (2013.01) |
| *G10L 25/90* | (2013.01) |
| *H04M 3/493* | (2006.01) |

(52) U.S. Cl.
CPC .............. *G10L 25/90* (2013.01); *H04M 3/493* (2013.01); *H04M 3/4936* (2013.01); *G06Q 30/02* (2013.01); *H04M 2203/401* (2013.01)

(58) Field of Classification Search
CPC .......... H04M 3/4936; H04M 2203/401; G06Q 30/02
See application file for complete search history.

(56) References Cited

U.S. PATENT DOCUMENTS

| | | | |
|---|---|---|---|
| 6,847,714 B2 | 1/2005 | Das et al. | |
| 7,180,997 B2 | 2/2007 | Knappe | |
| 7,349,527 B2 | 3/2008 | Yacoub et al. | |
| 7,372,952 B1 | 5/2008 | Wu et al. | |
| 7,653,543 B1 | 1/2010 | Blair et al. | |
| 8,600,753 B1* | 12/2013 | Conkie ................... G10L 13/00 |
| | | | 704/266 |
| 8,666,746 B2* | 3/2014 | Bangalore ............. G10L 15/197 |
| | | | 704/260 |
| 8,837,706 B2* | 9/2014 | Odinak ................... G10L 17/26 |
| | | | 379/88.02 |
| 8,856,007 B1* | 10/2014 | Stuttle .................. G06F 16/957 |
| | | | 704/260 |
| 9,472,182 B2* | 10/2016 | Luan ................... G06F 3/04847 |
| 10,224,022 B2 | 3/2019 | Lawrenson et al. | |
| 11,087,736 B2* | 8/2021 | Lawrenson ............. G10L 15/22 |
| 2002/0128838 A1 | 9/2002 | Veprek | |
| 2002/0184027 A1 | 12/2002 | Brittan et al. | |
| 2003/0216920 A1* | 11/2003 | Bao ......................... G10L 13/08 |
| | | | 704/E13.011 |
| 2004/0073427 A1* | 4/2004 | Moore .................... G10L 13/08 |
| | | | 704/E13.011 |
| 2004/0174434 A1* | 9/2004 | Walker ............... H04N 1/32128 |
| | | | 348/211.6 |
| 2008/0109845 A1* | 5/2008 | Hengel .................. G06Q 30/02 |
| | | | 725/36 |
| 2008/0167875 A1* | 7/2008 | Bakis .................... G10L 13/033 |
| | | | 704/260 |
| 2010/0312564 A1 | 12/2010 | Plljmpe | |
| 2010/0312565 A1* | 12/2010 | Wang ..................... G10L 13/00 |
| | | | 704/260 |
| 2012/0296654 A1* | 11/2012 | Hendrickson ........... G10L 13/02 |
| | | | 704/260 |
| 2014/0025383 A1 | 1/2014 | Dai et al. | |
| 2014/0038578 A1* | 2/2014 | Bouzid ................... H04W 4/18 |
| | | | 455/418 |
| 2014/0365226 A1 | 12/2014 | Sinha | |
| 2015/0286937 A1* | 10/2015 | Hildebrand ............. H04W 4/50 |
| | | | 706/11 |

OTHER PUBLICATIONS

Olinger, M.: "How to Measure App Success", Jul. 21, 2014 (Jul. 21, 2014), XP055196201, Retrieved from Internet: WRL: http://www.appmakr.com/blog/how-to-measure-app-success/, 6 pages.
European Office Action issued in Application No. 14806747.3 dated Jan. 18, 2018, 7 pages.
Office Action dated Sep. 12, 2019 issued by China National Intellectual Property Administration in Application No. 201480083090_3 (11 pages), and English-language translation thereof (5 pages).

\* cited by examiner

SYSTEMS AND METHODS FOR SELECTING A VOICE TO USE DURING A COMMUNICATION WITH A USER

CROSS-REFERENCE TO RELATED APPLICATIONS

This application is a continuation of application Ser. No. 16/264,874, filed on Feb. 1, 2019 (status pending), which is a continuation of application Ser. No. 15/525,720, which has a section 371 (c) date of May 10, 2017 (now U.S. Pat. No. 10,224,022, issued on Mar. 5, 2019), and which is a 35 U.S.C. § 371 National Stage of International Patent Application No. PCT/SE2014/051336, filed Nov. 11, 2014. The above identified applications and patent are incorporated by this reference.

TECHNICAL FIELD

This disclosure relates to selecting a voice to use during a communication with a user of a computing device.

BACKGROUND

A computing device (e.g., smartphone, tablet, phablet, laptop computer, desktop computer, smart tv, mobile gaming device, smart watch, smart glasses) is a device that can use a speech synthesizer to generate synthesized speech for use in audibly communicating with a user of the computing device. For example, the computing device may include a speech synthesizer that creates the synthesized speech by concatenating pieces of recorded speech that are stored in the computing device (e.g., stored in a database). Alternatively, the speech synthesizer of the computing device can incorporate a model of the vocal tract and other human voice characteristics ("voice model") to create a completely synthetic voice output.

When a speech synthesizer uses recorded speech to generate the synthesized speech, a single voice (e.g., a single voice actor) is typically used to record the speech. Similarly, when a speech synthesizer uses the model approach to create a synthetic voice, the speech synthesizer typically only uses a single voice model. In situations where the speech synthesizer uses a database that stores speech recorded by using different voices (e.g., speech recorded by different voice actors or speech recorded by the same voice actor who can create different voices), as well as in situations where the speech synthesizer has multiple voice models, the user of the computing device may be able to select the voice (e.g., the voice model or voice actor) that the speech synthesizer will use to generate the speech that is used to communicate with the user. The selected voice is then used by the speech synthesizer in subsequent communications with the user. As such, the characteristics of the synthesized speech do not change dynamically over time. For example, all of the speech produced by the speech synthesizer may have the same voice characteristics (e.g., the same emotion, phrasing, intonation, tone).

SUMMARY

This disclosure relates to a computing device having the capability to dynamically select a voice that will be used by a speech synthesizer in creating synthesized speech for use in communicating with a user of the computing device. Accordingly, in one aspect this disclosure provides a method performed by a computing device. The method includes the computing device performing a first audible communication with the user using a first voice (e.g., computing device outputs audible sound). The computing device collects user satisfaction data (USD), which is indicative of the user's satisfaction with an action performed by the user in response to the first audible communication. After collecting the user satisfaction data, the computing device determines a first satisfaction metric based on the collected user satisfaction data. At a later point in time, the computing device performs a second audible communication with the user using a second voice based on the determined first satisfaction metric, wherein the second voice is different than the first voice with respect to at least one voice characteristic. In some embodiments, the at least one voice characteristic is selected from a group comprising: an emotion, an intonation, a gender, a pitch, an accent, a phrasing, and a tone. The determined satisfaction metric, in some embodiments, is associated with one or more of: a communication type and a communication trigger. The second audible communication, in some embodiments, is of the same or similar communication type as the first audible communication and/or was triggered by the same or similar communication trigger that triggered the first audible communication. The communication type may be one of: a question, a request, a notification, or a recommendation, and the communication trigger may be any one of: an app purchase, an in-app purchase, a change in configuration, a trigger by an app, and a trigger by a web page.

In some embodiments, the first audible communication is of a first communication type, and the second audible communication is also of the first communication type. The computing device may collect USD for a first pair consisting of the first voice and the first communication type, and stores the first satisfaction metric such that the first satisfaction metric is associated with the first pair. The computing device can generate a second satisfaction metric for the first pair using at least some of the collected USD for the first pair, where the second satisfaction metric is different than the first satisfaction metric. The computing device can store the second satisfaction metric such that the second satisfaction metric is also associated with the first pair. The computing device can also determine that a second voice should be used during the second audible communication with the user based on the second satisfaction metric.

In some embodiments, the first audible communication with the user comprises audibly providing to the user a recommendation, and collecting the USD comprises determining that the user accepted the recommendation and updating a stored value that is used to indicate a total number of times the user accepted a particular type of recommendation. Generating the first satisfaction metric, in some embodiments, comprises calculating the first satisfaction metric using the updated stored value.

In some embodiments, the first audible communication with the user comprises audibly providing to the user a recommendation; and collecting the USD comprises: determining that the user accepted the recommendation and monitoring user actions indicative of whether the user is satisfied with the recommendation.

In some embodiments, the first audible communication with the user comprises audibly providing to the user a recommendation that the user change a configuration of the computing device. In such an embodiment, collecting the USD for the first voice may include determining that the user made the configuration change. In such embodiments, the computing device can be further configured to: update a first stored value that is used to indicate a total number of times the user accepted a particular type of recommendation; determine that the user reversed the configuration change; and update a second stored value that is used to indicate a total number of times the user reversed a configuration change. In generating the first satisfaction metric the computing device may be configured to calculate the first satisfaction metric using one or more of: the first updated stored value and the second updated stored value.

The above and other aspects and embodiments are described below.

DETAILED DESCRIPTION

As mentioned in the Summary section above, this disclosure relates to a computing device having the capability to dynamically select a voice that will be used by a speech synthesizer in creating synthesized speech for use in communicating with a user of the computing device. For example, in some embodiments, the computing device: i) employs the speech synthesizer to have a first audible communication with the user using a first voice; ii) stores user satisfaction data that can be used to determine a user's satisfaction with an action the user took in response to the first audible communication (in some embodiments, the satisfaction data could also be used to determine an effectiveness of the first voice, such as determining a degree to which the voice is successful in producing a desired result); and iii) determines whether a different voice should be used during a second audible communication with the user based on the stored user satisfaction data. In this way, the user's satisfaction can be increased. In embodiments, the first voice may have a particular phrasing, pitch, tone, intonation, sex (male or female), emotion (happy, neutral, sad, etc.), accent (e.g., an English accent), and/or any other voice-related characteristics. In some embodiments, the second voice differs from the first voice in one or more of the following ways: phrasing, pitch, tone, intonation, sex, emotion, accent.

An advantage of dynamically changing the voice that is used to communicate with the user based on gathered user satisfaction data is that changing the voice in this way may increase the user's satisfaction with the computing device. Also, dynamically changing the voice based on gathered user satisfaction data could cause a desired result to be achieved more often (e.g., changing the voice may result in the user altering his behavior in way that increases the user's satisfaction). For example, the choice of voice to be used in communicating with the user may influence an outcome of a transaction in a way that benefits the user and/or a service provider. For example, the choice of voice may influence the amount of purchases the user makes using the computing device and/or the amount of time that the user interacts with the computing device.

Figure 1:
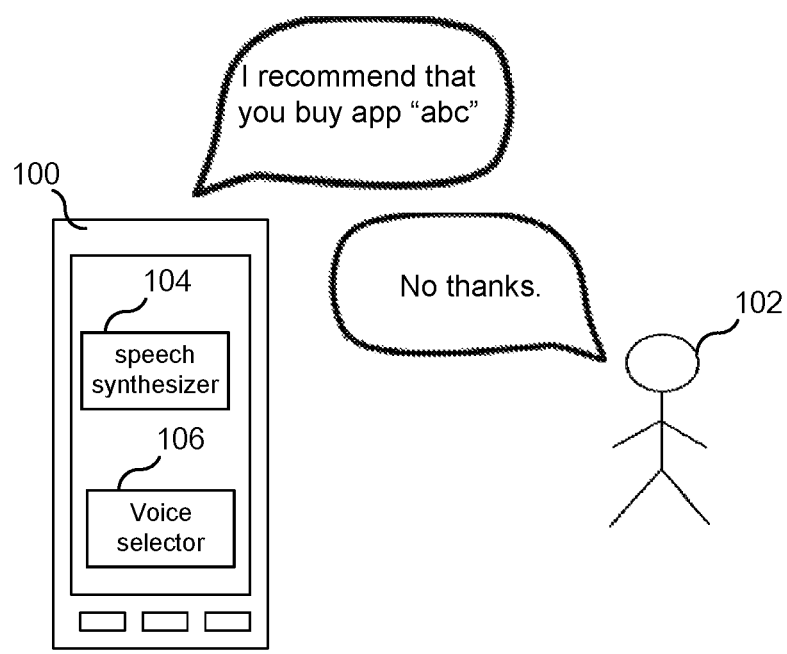
FIG. 1 shows an example computing device communication.
Figure 2:
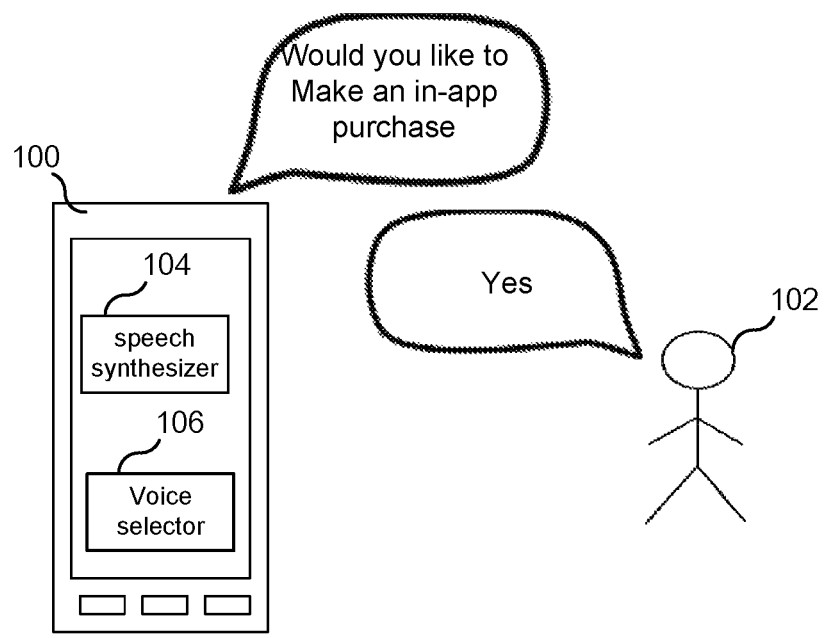
FIG. 2 shows an example computing device communication.
Figure 3:
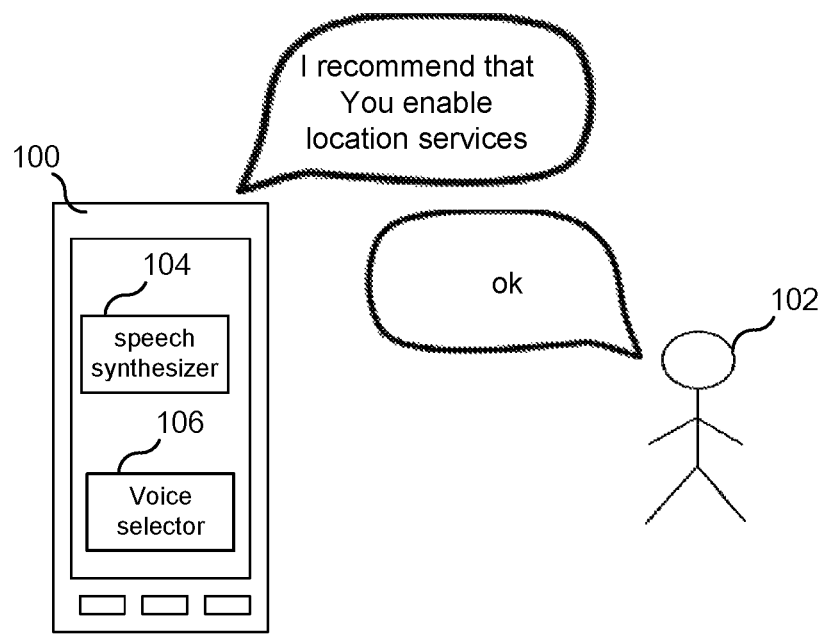
FIG. 3 shows an example computing device communication.

FIGS. 1-3 illustrate three different exemplary communications between a user 102 and a computing device 100 in which computing device 100 audibly communicates with user 102 using synthesized speech created by a speech synthesizer 104 using a voice selected by a voice selector 106. While FIGS. 1-3 shows computing device 100 being a stand-alone device, in other embodiments computing device 100 may be a distributed computing device that includes a client device that directly communicates with user 102 and a server device that receives and responds to requests from the client device. The server device may be co-located with the client device or it may be remotely located from the client device. In such a client/server embodiment the speech synthesizer 104 and/or the voice selector 106 may run, at least partly, on a server device.

FIG. 1 illustrates an app recommendation transaction. As shown in FIG. 1, computing device 100 suggests that user 102 may desire to acquire (e.g., purchase) app "abc." In response to the suggestion, user 102 may: i) accept the recommendation (i.e., proceed with purchasing app "abc"); ii) decline the recommendation (e.g., say "no thank you"); or iii) ignore the suggestion.

FIG. 2 illustrates user 102 communicating with some app (e.g., a game app or an e-commerce app) that is running on computing device 100. As shown in FIG. 2, during the user's interaction with the app, the app may audibly offer the user the option to make an in-app purchase. For example, in the case of an e-commerce app, the app may recommend to the user newly released items (books, songs) based on the user's past purchases. In response to the offer, user 102 may: i) proceed with making the in-app purchase; ii) say no thank you; or iii) ignore the offer.

FIG. 3 illustrates computing device 100 suggesting that user 102 may wish to change a setting of the computing device (in this example, the suggestion is to turn on a location services module). In response to the suggestion, user 102 may: i) proceed with the suggested action; ii) say no thank you; or iii) ignore the suggestion.

In each of the above described communications, it is expected that user 102's response to the suggestions/offers made to the user may be influenced by the voice that speech synthesizer 104 uses in making the offers/suggestions (i.e., the voice selected by voice selector 106). Accordingly, each voice that is available to be used by speech synthesizer 104 in communicating with the user may have a different effectiveness in influencing the user to take a certain action (e.g., change a setting, make a purchase, etc.) and, therefore, may impact the user's satisfaction with the computing device. Hence, computing device 100 (or, more specifically, voice selector 106) is configured to determine one or more satisfaction metrics for a particular voice that is used by the computing device 100 in audibly communicating with user 102 and to utilize the satisfaction metric(s) for the particular voice in determining whether to select a new voice and cause the speech synthesizer 104 to cease using the particular voice and use the selected new voice.

For example, in some embodiments, a plurality of communication types are defined, and computing device 100 is configured such that, for each defined communication type, computing device 100 stores user satisfaction data for the communication type. Using this stored user satisfaction data, computing device 100 can generate (e.g., calculate) a set of satisfaction metrics for each communication type, where the set of satisfaction metrics for any particular communication type includes, for each available voice, zero or more satisfaction metrics for the available voice. In this way, for each communication type, each available voice can be given one or more metrics for the communication type. Computing device 100 uses these satisfaction metrics to determine whether it should change the voice that is currently being used for a given communication type. In some embodiments, the following communication types are defined: a question, a request, a notification, a purchase recommendation, a configuration change recommendation.

For example, consider the scenario where voice-1 is the voice that is currently being used to communicate with the user during any communication that belongs to ether communication type A (e.g., notification) or communication type B (e.g., purchase recommendation). In such a scenario, voice-1 may have a satisfaction metric of 50 for communication type Type-A and voice-1 may have a satisfaction metric of 10 for communication type Type-B. Computing device 100 is configured to make a determination as to whether a new voice (e.g., voice-2) should be used during any communication that belongs to ether communication type A or communication type B, where the determination is based on voice-1's satisfaction metrics. That is, for example, computing device 100 compares voice-1's satisfaction metric for a given communication type to a threshold value (T) and, based on that comparison, determine that a new voice for that communication type should replace voice 1 (e.g., if voice-1's satisfaction metric for Type-X is below T, then a new voice will be used for all communications of Type-X). Hence, in this example if we assume T=15, then voice-1 will be replaced with a new voice (voice-2) for Type-B communications because voice-1's satisfaction metric for that communication type is less than 15.

In some embodiments, in addition to (or instead of) defining a plurality of communication types, a plurality of communication triggers are also defined, and computing device 100 is configured such that, for each defined communication trigger, computing device 100 stores user satisfaction data for the communication trigger. Using this stored user satisfaction data, computing device 100 can generate a set of satisfaction metrics for each communication trigger, where the set of satisfaction metrics for any particular communication trigger includes, for each available voice, zero or more satisfaction metrics for the available voice. In this way, for each communication trigger, each available voice can be given one or more satisfaction metrics for the communication trigger. Computing device 100 uses these satisfaction metrics to determine whether it should change the voice that is currently being used for a given communication trigger. In some embodiments, the following communication triggers are defined: i) app purchase, ii) in-app purchase, iii) a change in configuration, iv) a trigger by an app, and a trigger by a web page.

In some embodiments, the communication triggers can be multi-level (i.e., a parent communication trigger can have one or multiple child communication triggers). Taking the example of a parent communication trigger being an app purchase, examples of child communication triggers include: an app of a certain genre (e.g. kid's games, productivity etc.), apps of certain monetary value (e.g. over $10), an app purchase in a certain location (e.g. home or office), an app purchase at a certain time (e.g. evening). Further derivatives of child communication triggers are possible. Also communication triggers can be combined (e.g. the purchase of a certain genre of app made during a certain part of the day in a certain location). These combinations can form a separate communication trigger.

Table 1 below shows example user satisfaction data that computing device 100 may store for the "purchase recommendation" communication type. In some embodiments, the user satisfaction data in Table 1 is not only for a given communication type (e.g., "purchase recommendation") but also any given communication trigger (e.g., app purchase). That is, for example, each purchase recommendation recorded in Table 1 may be a purchase recommendation that was triggered by a particular communication trigger, such as, user 102 using computing device 100 to purchase an app from an app store. In this way, user satisfaction data can be associated with communication types and/or communication triggers.

TABLE 1

| Voice Id | Total # of purchase recommendations | Total # ignored | Total # acceptances | Total # declines | Usage level of items purchased |
|---|---|---|---|---|---|
| Voice-1 | 100 | 70 | 10 | 20 | 1 |
| Voice-2 | 0 | — | — | — | — |
| . | | | | | |
| . | | | | | |
| . | | | | | |

As shown in Table 1, computing device 100 can be configured to keep track of data regarding each purchase recommendation that is made to the user using synthesized speech. Specifically, computing device 100 can keep track of the total number of purchase recommendations that have been made since some arbitrary time in the past (e.g., 30 days ago) as well as the total number of times the user has ignored, accepted or declined a recommendation. Moreover, computing device 100 can also keep track of the usage level of the recommended items that were purchased. For example, in the example shown, the user purchased 10 recommended items, but the amount that the user used these items is low (i.e., a score of 1).

Similarly, table 2 below shows example user satisfaction data that computing device 100 may store for the "configuration change recommendation" communication type

TABLE 2

| Voice Id | Total # of configuration change recommendations | Total # ignored | Total # acceptances | Total # declines | # of changes reversed |
|---|---|---|---|---|---|
| Voice-1 | 100 | 0 | 90 | 10 | 89 |
| Voice-2 | 0 | — | — | — | — |
| . | | | | | |
| . | | | | | |
| . | | | | | |

As shown in table 2, computing device 100 can be configured to keep track of data regarding each configuration recommendation that is made to the user using synthesized speech. Specifically, computing device 100 can keep track of the total number of configuration change recommendations that have been made since some arbitrary time in the past (e.g., 30 days ago) as well as the total number of times the user has ignored, accepted or declined a recommendation. Moreover, computing device 100 can also keep track of the number of changes that the user reversed after making the recommended change. For example, in the example shown, the user made 90 of the recommended configuration changes, but reversed all of those changes but for one (i.e., the user reversed 89 of the 90 recommended changes).

Using the data shown in tables 1 and 2, which data we refer to as user satisfaction data, computing device 100 can generate (e.g., calculate) one or more satisfaction metrics (SMs) for each: voice/communication type/communication trigger 3-tuple, voice/communication type 2-tuple (pair), and voice/communication trigger pair. The set of one or more satisfaction metrics for, for example, each voice/communication type pair, can be stored in a look-up table, an example of which is shown in table 3 below.

TABLE 3

| Voice Id | Communication type-A (purchase recommendation) | Communication type-B (configuration change recommendation) | Communication type-C (notification) |
|---|---|---|---|
| Voice-1 | $SM_{1A1}$, $SM_{1A2}$, $SM_{1A3}$ | $SM_{1B1}$, $SM_{1B2}$, $SM_{1B3}$ | — |
| Voice-2 | — | — | $SM_{2C1}$ |

In the example shown, with respect to communication types Type-A and Type-B, computing device 100 computed a set of satisfaction metrics only for voice-1 because voice-2 has not yet been used to offer purchase recommendations or configuration change recommendations. But with respect to communication type-C, computing device 100 computed a set of satisfaction metrics only for voice-2 because voice-1 has not yet been used in any Type-C communication.

Computing device 100 is configured to employ the satisfaction metrics in a process for determining whether a new voice should replace a current voice for any of the given communication types. For example, computing device 100 is configured to employ the set of satisfaction metrics associated with the voice-1/communication type-A pair (i.e., one or more of the following satisfaction metrics: $SM_{1A1}$, $SM_{1A2}$, $SM_{1A3}$) to determine whether a new voice (e.g., voice-2) should replace voice-1 for Type-A communications. As a specific example, computing device 100 can be configured to replace voice-1 with a new voice for Type-A communications whenever the satisfaction metric $SM_{1A1}$ is less than a threshold (T1). As another specific example, computing device 100 can be configured to replace voice-1 with a new voice for Type-A communications whenever the following condition is met: satisfaction metric $SM_{1A3}$ is less than a threshold (T2) and $SM_{1A1}$ is greater than a threshold (T3).

In some embodiments, $SM_{1A1}$ and $SM_{1A3}$ are calculated as follows: $SM_{1A1}$=(total # of acceptances)/(total # of purchase recommendations)×100; $SM_{1A3}$=Usage Level of items purchased. Accordingly, if $SM_{1A3}$ is low, this could mean that the user is using the recommended items that the user purchased only infrequently or only for short periods of time. In situations where the acceptance percentage (i.e., $SM_{1A1}$) is high but the usage level is low, the user may become dissatisfied because the user is purchasing items that the user is not using (or is not using very much). Thus, in this scenario (i.e., when $SM_{1A3}$<T2 AND $SM_{1A1}$>T3), computing device can be configured to replace voice-1 for Type-A communications with a new voice, voice-2. Over time, computing device 100 will store user satisfaction data for the voice-2/communication type-A pair, as discussed above, and will be able to generate a set of satisfaction metrics for the voice-2/communication type-A pair. Once the satisfaction metrics for the voice-2/communication type-A pair are generated, computing device 100 will determine whether, for Type-A communications, voice-2 should be replaced with a difference voice (e.g. voice-1 or voice-3). In some embodiments, if $SM_{1A1}$ is low (i.e., the user is accepting only a small percentage of the purchase recommendations), computing device 100 may attempt to increase the acceptance percentages by selecting a new voice (e.g., voice-2) to use for making purchase recommendations.

Figure 4:
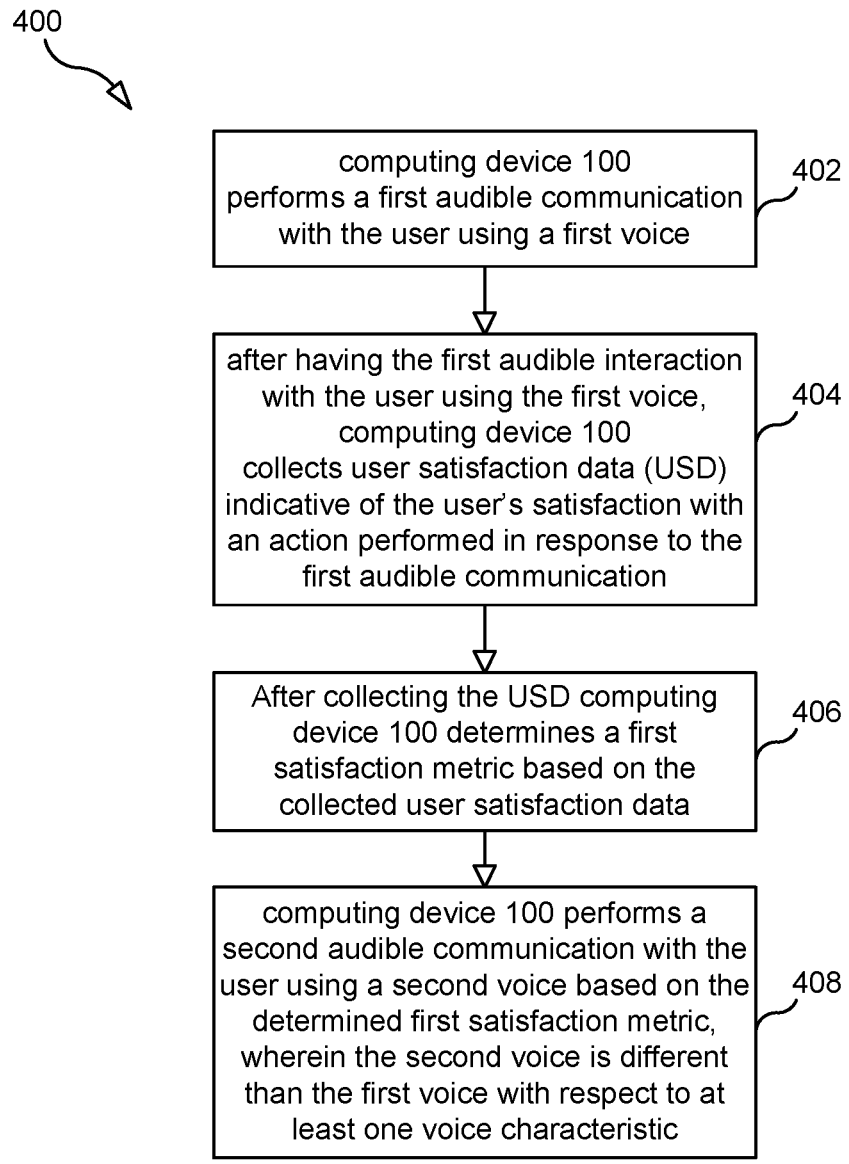
FIG. 4 is a flow chart illustrating a process according to some embodiments.

FIG. 4 is a flow chart illustrating a process 400 performed by computing device 100 according to some embodiments. In step 402, computing device 100 performs a first audible communication with the user using a first voice (e.g., computing device outputs audible sound). In step 404, computing device 100 collects user satisfaction data (USD) (described above), which is indicative of the user's satisfaction with an action performed by the user in response to the first audible communication. In step 406, after collecting the user satisfaction data, determining a first satisfaction metric based on the collected user satisfaction data. In step 408, computing device 100 performs a second audible communication with the user using a second voice based on the determined first satisfaction metric, wherein the second voice is different than the first voice with respect to at least one voice characteristic. In some embodiments, the at least one voice characteristic is selected from a group comprising: an emotion, an intonation, a gender, a pitch, an accent, a phrasing, and a tone. The determined satisfaction metric, in some embodiments, is associated with one or more of: a communication type and a communication trigger. The second audible communication, in some embodiments, is of the same or similar communication type as the first audible communication and/or was triggered by the same or similar communication trigger that triggered the first audible communication. As described above, the communication type may be one of: a question, a request, a notification, or a recommendation, and the communication trigger may be any one of: an app purchase, an in-app purchase, a change in configuration, a trigger by an app, and a trigger by a web page.

In some embodiments, the first audible communication is of a first communication type, and the second audible communication is also of the first communication type. Computing device 100 may collect USD for a first pair consisting of the first voice and the first communication type, and process 400 may further include storing the first satisfaction metric such that the first satisfaction metric is associated with the first pair. Computing device 100 can generate a second satisfaction metric for the first pair using at least some of the collected USD for the first pair, where the second satisfaction metric is different than the first satisfaction metric. Computing device 100 can store the second satisfaction metric such that the second satisfaction metric is also associated with the first pair. Computing device 100 can also determine that a second voice should be used during the second audible communication with the user based on the second satisfaction metric.

In some embodiments: the first audible communication with the user comprises audibly providing to the user a recommendation; collecting the USD comprises: determining that the user accepted the recommendation and updating a stored value that is used to indicate a total number of times the user accepted a particular type of recommendation; and generating the first satisfaction metric comprises calculating the first satisfaction metric using the updated stored value.

In some embodiments: the first audible communication with the user comprises audibly providing to the user a recommendation; and collecting the USD comprises: determining that the user accepted the recommendation and monitoring user actions indicative of whether the user is satisfied with the recommendation.

In some embodiments: the first audible communication with the user comprises audibly providing to the user a recommendation that the user change a configuration of the computing device. In such an embodiment, collecting the USD for the first voice may include determining that the user made the configuration change. In such embodiments, computing device 100 can be further configured to: update a first stored value that is used to indicate a total number of times the user accepted a particular type of recommendation; determine that the user reversed the configuration change; and update a second stored value that is used to indicate a total number of times the user reversed a configuration change. In generating the first satisfaction metric computing device 100 may be configured to calculate the first satisfaction metric using one or more of: the first updated stored value and the second updated stored value.

Figure 5:
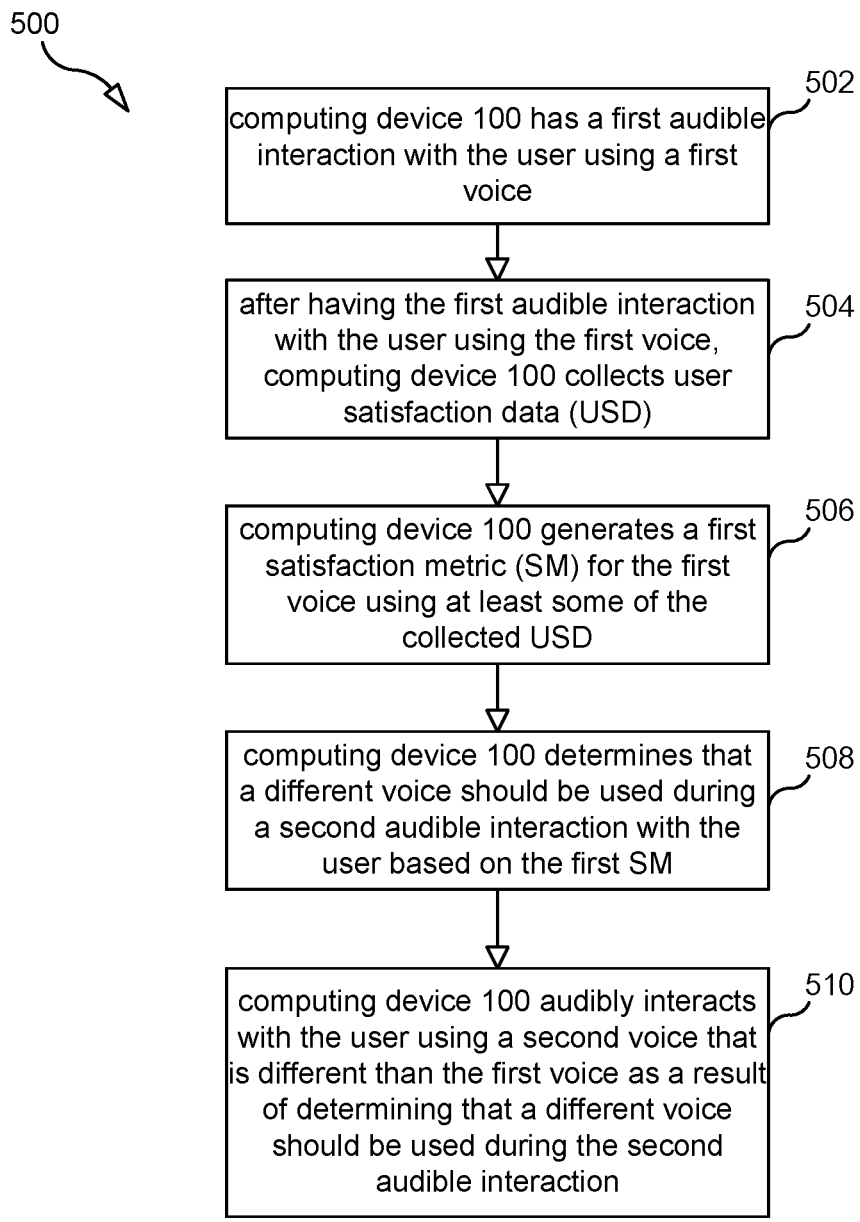
FIG. 5 is a flow chart illustrating a process according to some embodiments.

FIG. 5 is a flow chart illustrating a process 500 performed by computing device 100 according to other embodiments. In step 502, computing device 100 has a first audible communication with the user using a first voice (e.g., speech synthesizer outputs speech that recommends to the user that the user acquire an item, such as an app or a media item). In step 504, after having the first audible communication with the user using the first voice, computing device 100 collects user satisfaction data (USD) for the first voice. In embodiments where the communications are categorized into types, computing device 100 collects USD for a plurality of communication type/voice tuples (e.g., pairs). For example, computing device 100 is configured to monitor user's use of an item acquired by the user in response to the first audible communication and record data regarding that use. In step 506, computing device 100 generates a first satisfaction metric for the first voice using at least some of the collected USD. In embodiments where the communications are categorized into types, the first satisfaction metric is associated with a pair comprising the first voice and a communication type. In step 508, computing device 100 determines that a different voice should be used during a second audible communication with the user based on the first satisfaction metric. In step 510, computing device 100 audibly communicates with the user using a second voice that is different than the first voice as a result of determining that a different voice should be used during the second audible communication.

Figure 6:
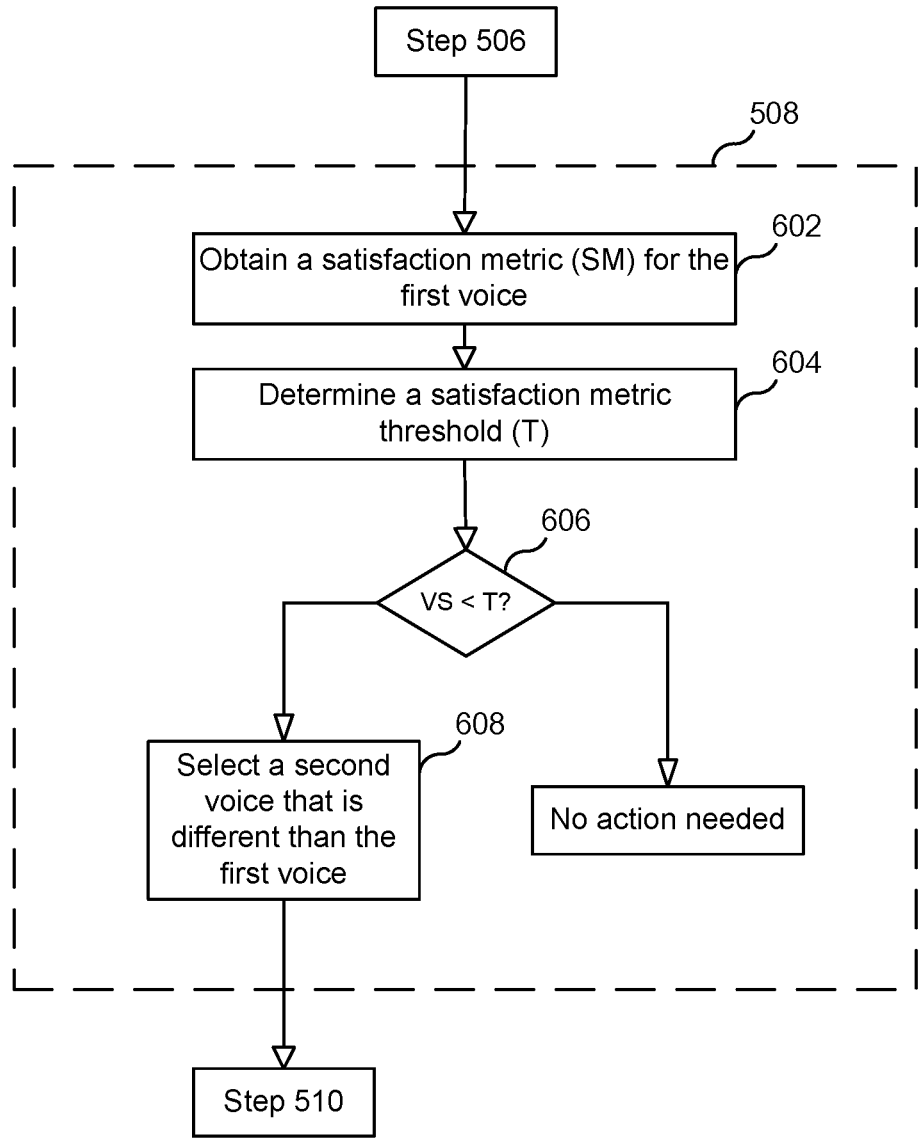
FIG. 6 is a flow chart illustrating a process according to some embodiments.

FIG. 6 illustrates steps that may be performed to implement step 508 of process 500. As shown in FIG. 6, step 508 may begin with step 602, where the computing device obtains a satisfaction metric (SM) for the first voice. As discussed above, a voice may be associated with a set of one or more satisfaction metrics. In step 604, computing device 100 determines a satisfaction metric threshold (T). In step 606, computing device 100 compares SM with T (e.g., computing device determines whether SM is less than T). Depending on the outcome of the comparison, computing device may do nothing or computing device may select a second voice that is different than the first voice (step 608). The second voice may be selected from a set of available voices. The selection of the second voice from the set of available voices may be a random selection or a selection based on a rule. For example, a rule based selection may be selection that is based on the difference between SM and T.

For example, the rule may specify that if SM is less than T by an amount Delta1, then a certain voice should be selected (e.g., voice-2), otherwise a different certain voice should be selected (e.g., voice-3).

Figure 7:
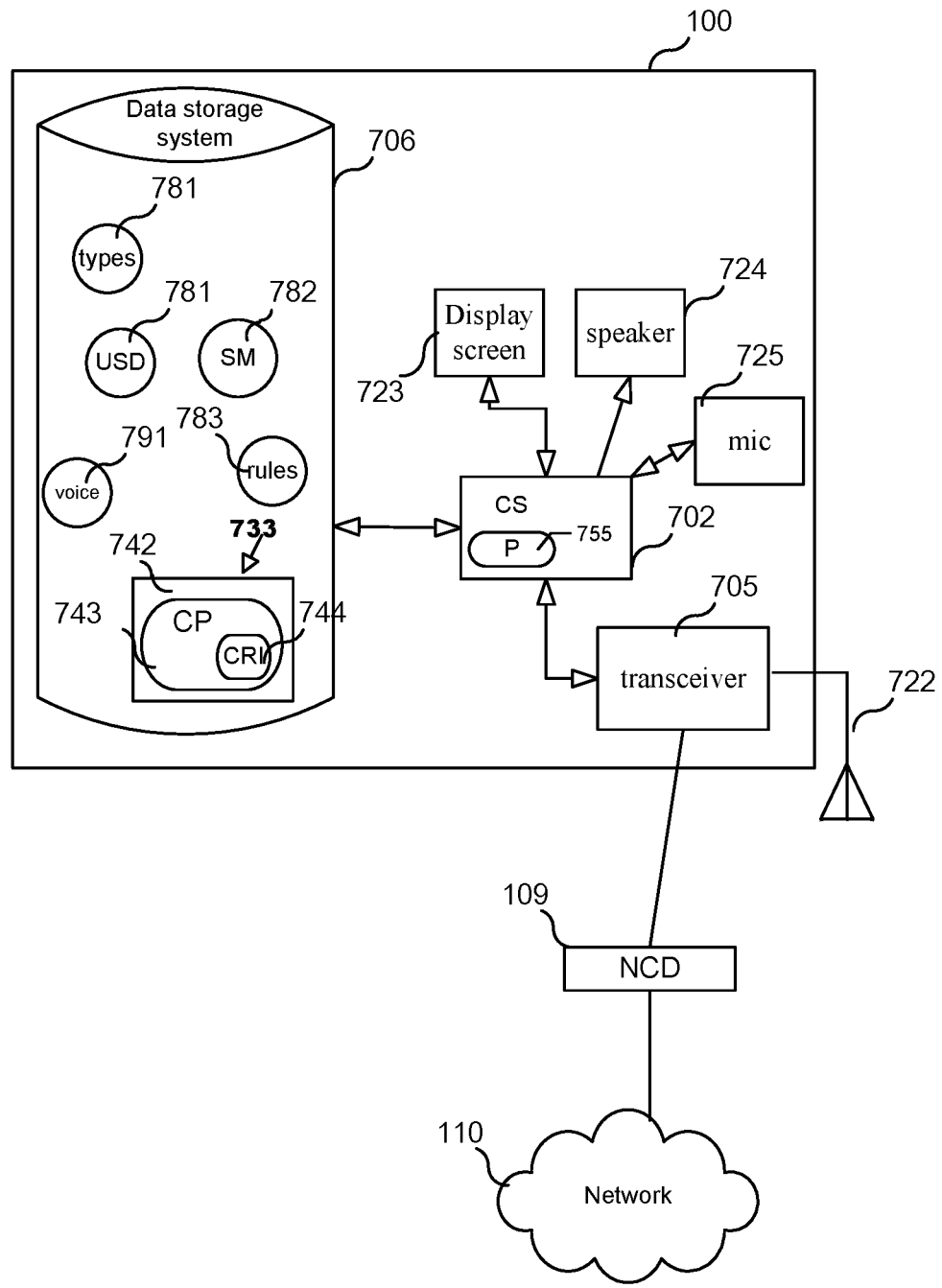
FIG. 7 is a diagram illustrating a computing device according to some embodiments.

FIG. 7 illustrates a block diagram of computing device 100. As shown in FIG. 7, computing device 100 may include or consist of: a computer system (CS) 702, which may include one or more processors 755 (e.g., a microprocessor) and/or one or more circuits, such as an application specific integrated circuit (ASIC), field-programmable gate arrays (FPGAs), a logic circuit, and the like; a transceiver 705 for communicating with another device; a data storage system 706, which may include one or more non-volatile storage devices and/or one or more volatile storage devices (e.g., random access memory (RAM)); a display screen 723, a speaker 724, and a microphone 725. Transceiver 705 may be connected to an antenna 722 as shown in FIG. 7 and/or it may be capable of connecting to a network connection device 109 (e.g., router, switch, modem, etc) that is connected to a network 110 (e.g., the Internet).

In embodiments where computing device 100 includes a processor 755, a computer program product (CPP) 733 may be provided. CPP 733 includes or is a computer readable medium (CRM) 742 storing a computer program (CP) 743 comprising computer readable instructions (CRI) 744. CP 743 may include an operating system (OS) and/or application programs. CRM 742 may include a non-transitory computer readable medium, such as, but not limited, to magnetic media (e.g., a hard disk), optical media (e.g., a DVD), solid state devices (e.g., random access memory (RAM), flash memory), and the like. In some embodiments, CP 743 implements, among other things, speech synthesizer 104 and voice selector 106.

As further shown, data storage system 706 can be used to store various items. For example, DSS 106 may store: a database of pre-recorded voice segments 791, a database containing user satisfaction data (USD) 781, a database 781 (e.g., table) that maps each of a plurality of communications to one or more communication types, a rules database 783 for storing voice selection rules, and a satisfaction metric (SM) database 782. SM database 782 functions to associate one or more available voices with a set of one or more satisfaction metrics. In some embodiments, SM database is of the form shown in Table 3, above. That is, SM database 782, in some embodiments, functions to associate (i.e., map) a voice/communication-type pair to a set of satisfaction metrics.

In some embodiments, the CRI 744 of computer program 743 is configured such that when executed by computer system 702, the CRI causes the computing device 100 to perform steps described above (e.g., steps described above with reference to the flow charts and message flows shown in the drawings). In other embodiments, computing device 100 may be configured to perform steps described herein without the need for a computer program. That is, for example, computer system 702 may consist merely of one or more ASICs. Hence, the features of the embodiments described herein may be implemented in hardware and/or software.

Figure 8:
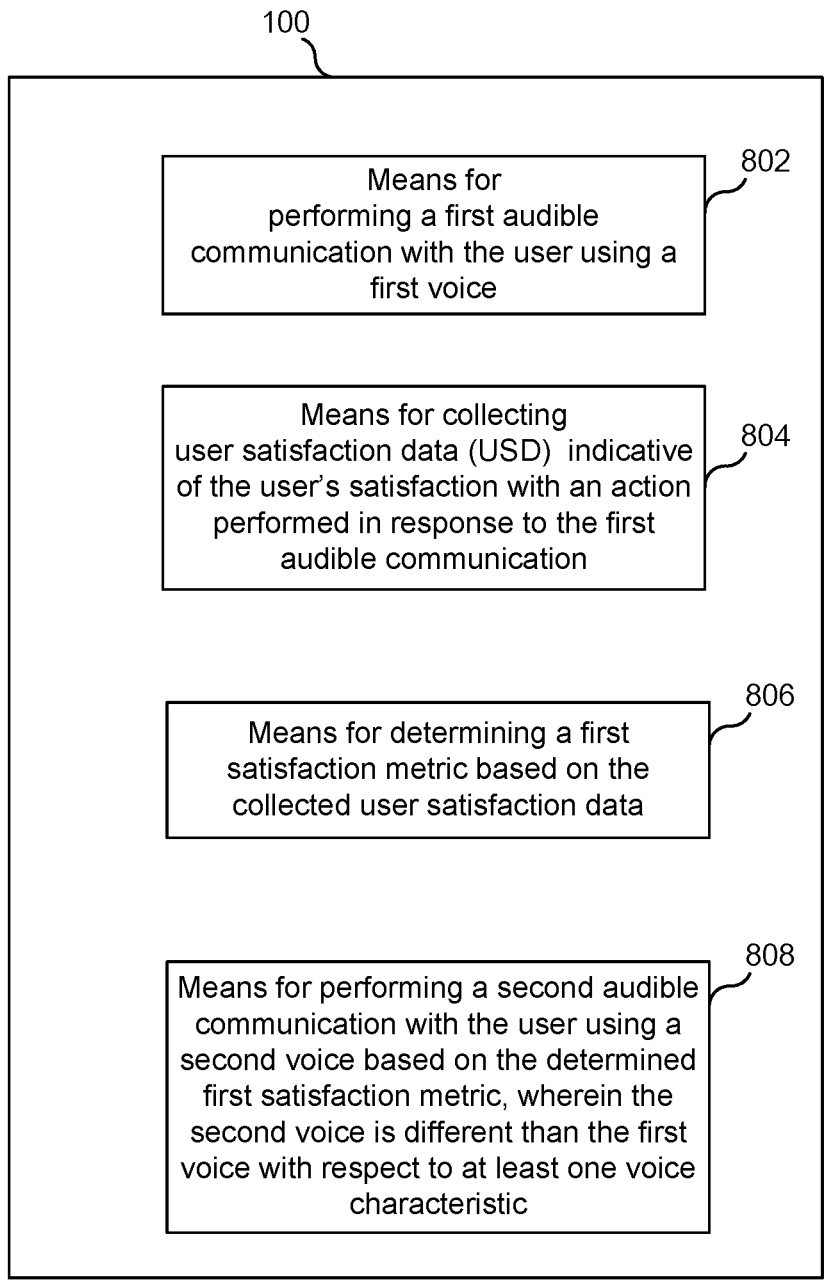
FIG. 8 is a functional diagram of a computing device according to some embodiments.

FIG. 8 illustrates a functional block diagram of computing device 100 according to some embodiments. As shown, in some embodiments, computing device 100 includes: means 802 for performing a first audible communication with the user using a first voice; means 804 for collecting user satisfaction data, USD, which is indicative of the user's satisfaction with an action performed by the user in response to the first audible communication; means 806 for, after collecting the user satisfaction data, determining a first satisfaction metric based on the collected user satisfaction data; and means 808 for performing a second audible communication with the user using a second voice based on the determined first satisfaction metric, wherein the second voice is different than the first voice with respect to at least one voice characteristic.

Figure 9:
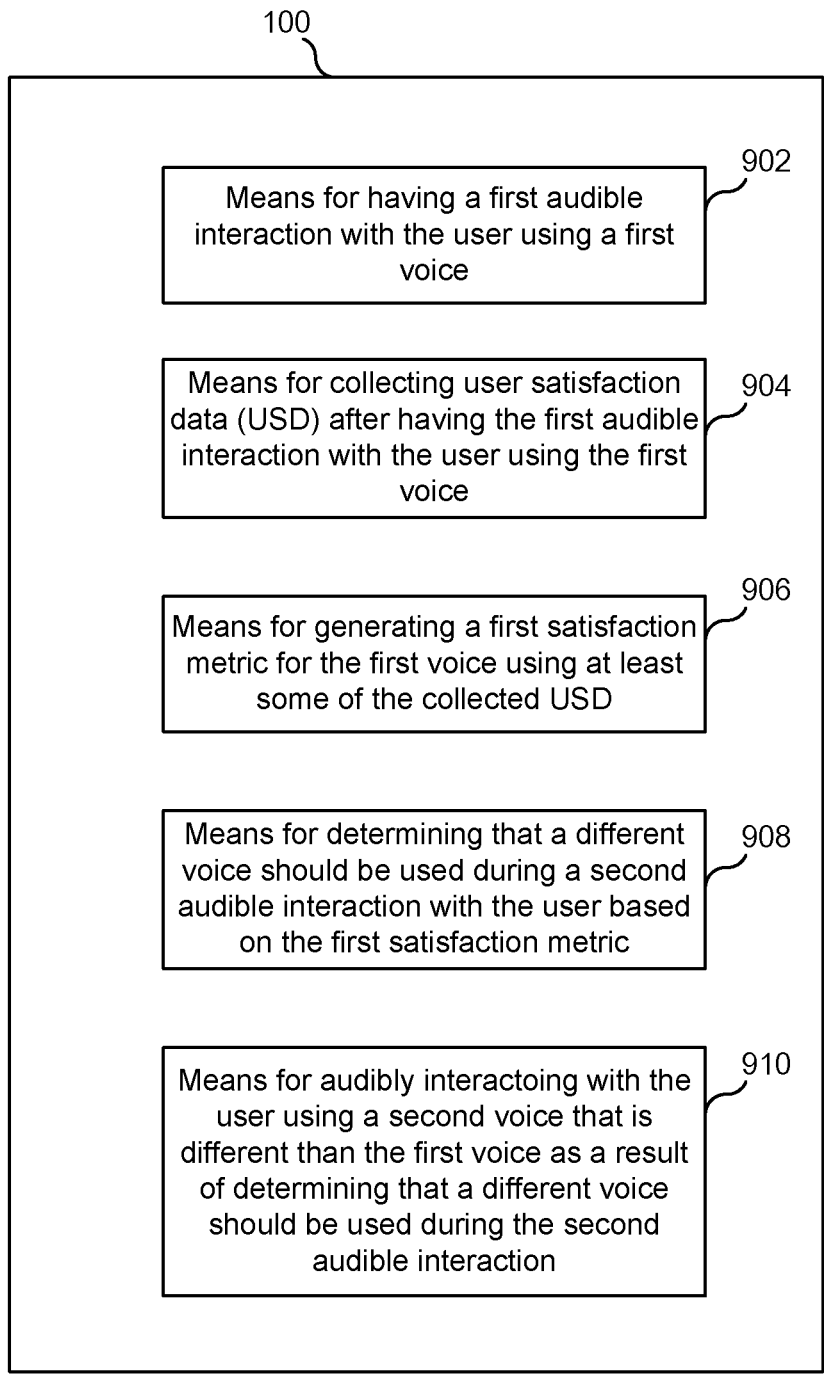
FIG. 9 is a functional diagram of a computing device according to some embodiments.

FIG. 9 illustrates a functional block diagram of computing device 100 according to some embodiments. As shown, in some embodiments, computing device 100 includes: means 902 for having a first audible communication with the user using a first voice; means 904 for collecting user satisfaction data (USD) after having the first audible communication with the user using the first voice; means 906 for generating a first satisfaction metric for the first voice using at least some of the collected USD; means 908 for determining that a different voice should be used during a second audible communication with the user based on the first satisfaction metric; and means 910 for audibly communicating with the user using a second voice that is different than the first voice as a result of determining that a different voice should be used during the second audible communication.

While various embodiments have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method in a computing device for audibly communicating with a particular user of the computing device, the method comprising:
   performing a first audible communication with the particular user using a first voice;
   obtaining information indicating an effectiveness of the first voice in influencing the particular user to make a change to an operational parameter of the computing device or make a purchase, wherein obtaining the information indicating the effectiveness of the first voice comprises obtaining a first value that indicates a total number of times the particular user accepted a recommendation that was made to the particular user using the first voice;
   determining, based on the first value that indicates the total number of times the particular user accepted a recommendation that was made to the particular user using the first voice, whether to perform a second audible communication with the particular user using a second voice that replaces the first voice; and
   performing the second audible communication with the particular user using the second voice, wherein
   the first audible communication comprises synthesized speech that was synthesized using the first voice, and
   the second audible communication comprises synthesized speech that was synthesized using the second voice having a different voice characteristic than the first voice.

2. The method of claim 1, wherein
   the second voice is different than the first voice with respect to at least one voice characteristic, and
   the at least one voice characteristic is an emotion, an intonation, a gender, a pitch, an accent, or a tone.

3. The method of claim 1, wherein
   performing the first audible communication comprises audibly providing to the particular user a recommendation to make the change to the operational parameter of the computing device, and
   obtaining the information indicating the effectiveness of the first voice comprises determining whether the particular user made the change to the operational parameter of the computing device.

4. The method of claim 3, wherein obtaining the information indicating the effectiveness of the first voice comprises determining whether the particular user reversed the change to the operational parameter.

5. The method of claim 1, wherein obtaining the information indicating the effectiveness of the first voice further comprises:
   determining whether the particular user made the change to the operational parameter of the computing device or made the purchase; and
   as a result of determining that the particular user made the change to the operational parameter of the computing device or made the purchase, updating the first value.

6. The method of claim 5, wherein
   the recommendation is a particular type of recommendation, and
   the first value indicates a total number of times the particular user accepted recommendations of the particular type that were made to the particular user using the first voice.

7. The method of claim 6, further comprising, prior to performing the first audible communication with the particular user using the first voice, storing a second value that indicates a total number of times that the first voice was used to audibly provide to the particular user a recommendation of the particular type.

8. The method of claim 7, further comprising:
   storing a third value that indicates a total number of times that the second voice was used to audibly provide to the particular user a recommendation of the particular type, and
   storing a fourth value that indicates a total number of times the particular user accepted recommendations of the particular type that were made to the particular user using the second voice.

9. The method of claim 5, wherein the method further comprises, prior to performing the first audible communication with the particular user using the first voice, storing a second value that indicates a total number of times the particular user accepted a recommendation that was made to the particular user using the second voice.

10. The method of claim 9, wherein the method further comprises, prior to performing the first audible communication with the particular user using the first voice:
    storing a third value that indicates a total number of times that the first voice was used to audibly provide to the particular user a recommendation, and
    storing a fourth value that indicates a total number of times that the second voice was used to audibly provide to the particular user a recommendation.

11. The method of claim 1, wherein
performing the first audible communication comprises audibly providing to the particular user a recommendation to make the purchase.

12. The method of claim 11, wherein
obtaining the information indicating the effectiveness of the first voice comprises determining whether the particular user made the purchase.

13. The method of claim 1, the information indicating the effectiveness of the first voice in influencing the particular user to change an operational parameter of the computer device comprises information indicating the effectiveness of the first voice in influencing the particular user to activate a module of the computing device.

14. A computer program product comprising a non-transitory computer readable medium storing a computer program for configuring a computing device to perform the method of claim 1.

15. A computing device, the computing device comprising:
a memory; and
a processor coupled to the memory, wherein the computing device is configured to:
perform a first audible communication with the particular user using a first voice;
obtain information indicating an effectiveness of the first voice in influencing the particular user to make a change to an operational parameter of the computing device or make a purchase, wherein obtaining the information indicating the effectiveness of the first voice comprises obtaining a first value that indicates a total number of times the particular user accepted a recommendation that was made to the particular user using the first voice;
determine, based on the first value that indicates a total number of times the particular user accepted a recommendation that was made to the particular user using the first voice, whether to perform a second audible communication with the particular user using a second voice that replaces the first voice; and
perform the second audible communication with the particular user using the second voice, wherein
the first audible communication comprises synthesized speech that was synthesized using the first voice, and
the second audible communication comprises synthesized speech that was synthesized using the second voice having a different voice characteristic than the first voice.

16. The computing device of claim 15, wherein
the second voice is different than the first voice with respect to at least one voice characteristic, and
the at least one voice characteristic is an emotion, an intonation, a gender, a pitch, an accent, or a tone.

17. The computing device of claim 15, wherein
the computing device is configured to perform the first audible communication by audibly providing to the particular user a recommendation to make the change to the operational parameter of the computing device, and
the computing device is configured to obtain the information indicating the effectiveness of the first voice by performing a process that includes determining whether the particular user made the change to the operational parameter of the computing device.

18. The computing device of claim 17, wherein
the process further comprises: as a result of determining that the particular user made the change to the operational parameter of the computing device, updating the first value.

19. The computing device of claim 18, wherein
the recommendation is a particular type of recommendation, and
the first value indicates a total number of times the particular user accepted recommendations of the particular type that were made to the particular user using the first voice.

20. The computing device of claim 19, wherein the computing device is further configured to store a second value that indicates a total number of times that the first voice was used to audibly provide to the particular user a recommendation of the particular type.

21. The computing device of claim 20, wherein the computing device is further configured to:
store a third value that indicates a total number of times that the second voice was used to audibly provide to the particular user a recommendation of the particular type, and
store a fourth value that indicates a total number of times the particular user accepted recommendations of the particular type that were made to the particular user using the second voice.

22. The computing device of claim 17, wherein the process further comprises determining whether the particular user reversed the configuration change.

23. The computing device of claim 15, wherein the first audible communication comprises a recommendation that the particular user make a purchase.

24. The computing device of claim 23, wherein
the computing device is configured to obtain the information indicating the effectiveness of the first voice by performing a process that includes determining whether the particular user made the purchase.

* * * * *